United States Patent
Nair et al.

(10) Patent No.: US 11,407,385 B2
(45) Date of Patent: Aug. 9, 2022

(54) REAL TIME FUEL ADDITIZATION

(71) Applicant: Additech Inc., Sugar Land, TX (US)

(72) Inventors: Sujith Velayudhan Nair, Seabrook, TX (US); Vincent Charles Ciardo, Pearland, TX (US)

(73) Assignee: Additech Inc., Sugar Land, TX (US)

( * ) Notice: Subject to any disclaimer, the term of this patent is extended or adjusted under 35 U.S.C. 154(b) by 149 days.

(21) Appl. No.: 16/863,635

(22) Filed: Apr. 30, 2020

(65) Prior Publication Data

US 2020/0353901 A1 Nov. 12, 2020

Related U.S. Application Data

(60) Provisional application No. 62/845,027, filed on May 8, 2019.

(51) Int. Cl.
*B67B 7/00* (2006.01)
*B60S 5/02* (2006.01)
*F02B 77/04* (2006.01)
*G05D 11/13* (2006.01)

(52) U.S. Cl.
CPC .............. *B60S 5/02* (2013.01); *F02B 77/04* (2013.01); *G05D 11/13* (2013.01)

(58) Field of Classification Search
CPC .......... B67D 7/744; B67D 2007/748; G05D 11/132; G05D 11/006; G07F 13/025; B01F 15/0416
USPC ........................................................ 222/1
See application file for complete search history.

(56) References Cited

U.S. PATENT DOCUMENTS

| | | | | | |
|---|---|---|---|---|---|
| 5,163,586 | A | * | 11/1992 | Zinsmeyer | B67D 7/744 222/14 |
| 5,992,473 | A | * | 11/1999 | Hammonds | B67D 7/74 141/9 |
| 2010/0263348 | A1 | * | 10/2010 | Gage | F02C 3/305 60/39.463 |
| 2015/0119611 | A1 | * | 4/2015 | Ball | C10L 1/026 585/14 |
| 2015/0157992 | A1 | * | 6/2015 | Boticki | B01F 5/043 137/15.09 |
| 2016/0033305 | A1 | * | 2/2016 | Mehnert | G01D 5/145 324/207.18 |
| 2016/0245443 | A1 | * | 8/2016 | Zonneveld | F16L 37/18 |
| 2018/0237289 | A1 | * | 8/2018 | Markwardt | G05D 11/13 |
| 2019/0112178 | A1 | * | 4/2019 | Khowaiter | B67D 7/00 |

* cited by examiner

*Primary Examiner* — Long T Tran
*Assistant Examiner* — James J Kim
(74) *Attorney, Agent, or Firm* — Vorys, Sater, Seymour and Pease LLP

(57) ABSTRACT

A fuel dispensing system includes that receives fuel from a fuel storage tank, and a blending system in fluid communication with the fuel dispensing unit. The blending system including a fuel conveyance device that receives the fuel from the fuel dispensing unit, and an additive conveyance device that pumps a fuel additive to be blended with the fuel based on a volumetric flow rate of the fuel, whereby the blending system provides a product mixture having a known fuel-to-fuel additive ratio. A hose and a nozzle are fluid communication with the blending system to dispense the product mixture.

19 Claims, 5 Drawing Sheets

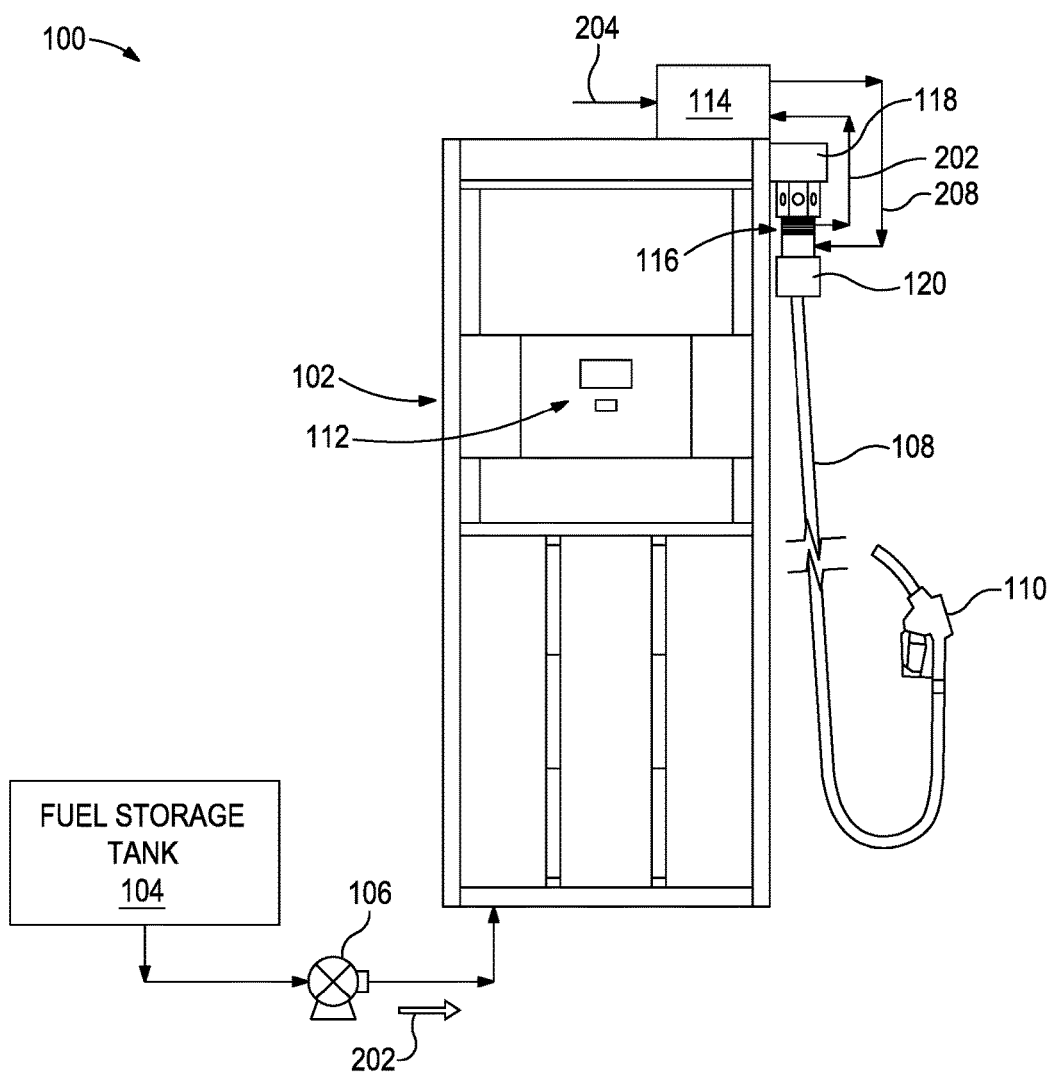
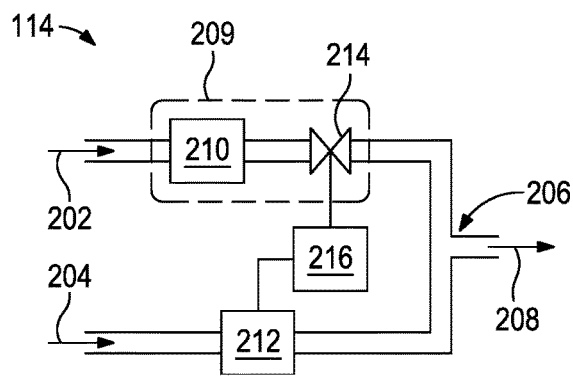
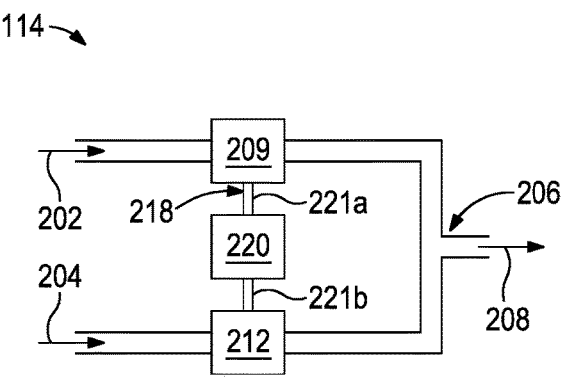
FIG. 1
FIG. 2A
FIG. 2B

REAL TIME FUEL ADDITIZATION

BACKGROUND

Gasoline retailers can improve various qualities of gasoline products supplied to consumers by offering blends of a variety of additives with the dispensed fuel. The need for fuel additives has increased because of the continuing demand by car owners for enhanced engine performance from their high tech engines, while at the same time, keeping costs low and satisfying the needs for high fuel mileage and mandated low emission levels of air pollutants. As a result, oil refiners or companies have developed fuel additives and fuel components that can be blended with the commodity (baseline) gasoline to improve octane quality, remove carbon deposits from combustion chambers and fuel injectors, and reduce emissions by adding oxygenates.

Oil refiners commonly blend fuel and fuel additives at refineries and deliver to fuel and service stations a pre-blended, additive-fuel gasoline mixture. At the service station, such pre-blended mixtures can be selected by a consumer and pumped directly to the consumer's vehicle from an on-site fuel dispenser.

More recently, however, fuel additives may be blended with a fuel on-demand at the fuel dispenser, which provides the consumer with a pre-determined, fixed quantity of fuel additive. When the desired quantity of fuel additive is delivered (dispensed), however, the blending process ceases.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1 is a schematic diagram of an example fuel dispensing system that may incorporate the principles of the present disclosure.

FIGS. 2A and 2B are schematic flow diagrams of examples of the blending system of FIG. 1, according to one or more embodiments.

DETAILED DESCRIPTION

Figure 2C:
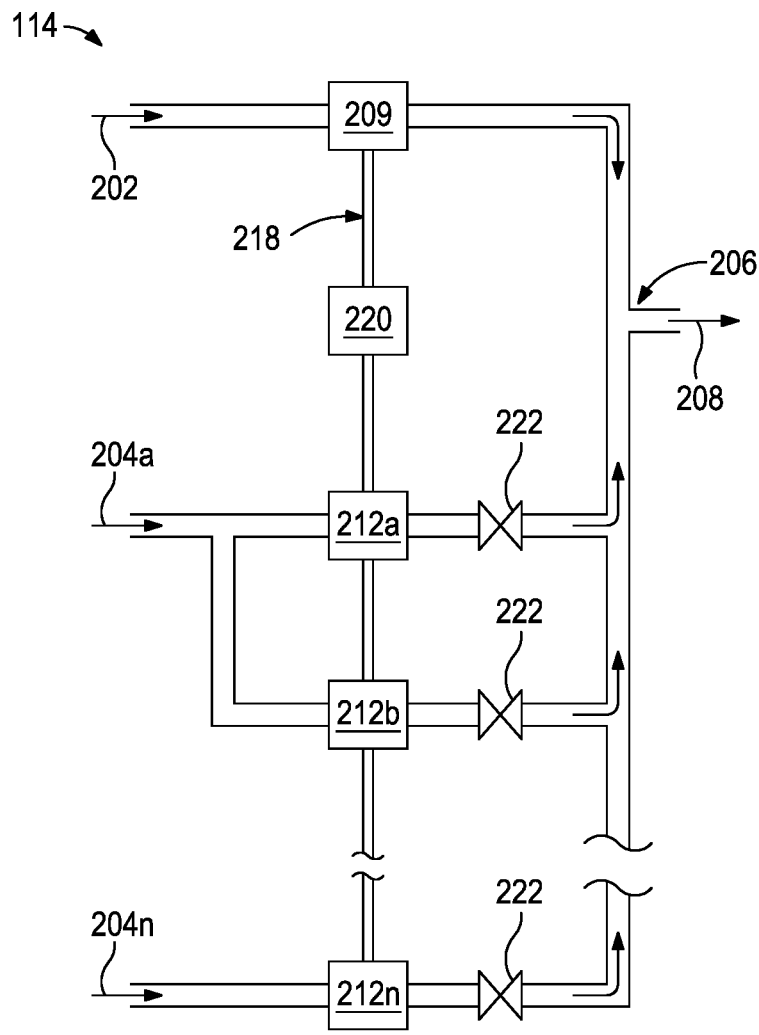
FIG. 2C is a schematic flow diagram of yet another example of the blending system of FIG. 1, according to one or more additional embodiments.

The present disclosure is related to dispensing fuel and, more particularly, to the real-time and continuous additization of a fuel additive to a fuel stream based on the volumetric flow rate of the fuel.

The systems and methods described herein can blend (intermix) in real-time at least two flow streams having radically different fluid properties and volumetric flow; e.g., in the hundreds or thousands of parts per million (ppm) range. Various internal controls or mechanisms in the system may allow an operator to calibrate the system such that a known ratio of the first and second fluid streams is consistently provided irrespective of the density and viscosity of the two fluids. In some embodiments, the presently described systems are completely passive in nature and require no power input. Rather, such systems may be designed to harvest energy from the flow of the first fluid to regulate the amount of the second fluid introduced into and blended with the first fluid.

While the present disclosure is generally related to blending fuel additives with fuels for use in internal combustion engines, the principles of the present disclosure are equally applicable to other industries that require mixing or blending of two or more fluid streams at set or known flow rates. Example industries in which the principles discussed herein may alternatively be applicable include, but are not limited to, the food processing industry, the beverage industry, the nutraceutical processing industry, paint processing, pharmaceutical manufacturing, petro-chemicals, the textile industry, personal and beauty product manufacturing, the industrial cleaning, sanitation, and remediation industries, or any combination thereof. The principles discussed herein may also be applicable to and otherwise satisfy the needs of any industrial control process requiring the exact real-time ratio control blending of two fluids, thus eliminating the need for cybernation, or the automatic control of a process by means of computer.

Real-Time Fuel Additive System

FIG. 1 is a schematic diagram of an example fuel dispensing system 100 that may incorporate the principles of the present disclosure. The fuel dispensing system 100 (hereafter the "system 100") may be located at a service station, for example, or any other location where gasoline (fuel) may be purchased and dispensed for use. As illustrated, the system 100 may include a fuel dispensing unit 102 in fluid communication with a fuel storage tank 104. Fuel (or gasoline) from a refinery may be delivered and deposited in the fuel storage tank 104, and an interconnected pump 106 may be activated to pump the fuel to the fuel dispensing unit 102. A hose 108 extends from the fuel dispensing unit 102 and a nozzle 110 is arranged at the end of the hose 108 to allow a user (e.g., a consumer) to dispense the fuel as needed. The fuel dispensing unit 102 may also include a display panel 112 where the user may select a desired fuel for dispensing and/or undertake financial transactions to purchase the desired fuel.

The display panel 112 may also allow the user to select a fuel additive to be blended with the fuel, in accordance with the principles of the present disclosure. Example fuel additives that may be selected and blended with the fuel include, but are not limited to, detergents, oxidizers, stabilizers (anti-oxidants), anti-knock agents, lead scavengers, fuel dyes, antifreeze, cylinder lubricants, anti-gelling agents, fuel injector cleaners, octane boosters, and any combination thereof.

According to embodiments of the present disclosure, the system 100 further includes a continuous blending system 114 configured to continuously blend a fuel additive with the fuel based on the flow of the fuel, such that the resulting product mixture dispensed from the nozzle 110 has a known ratio of fuel and fuel additive. More particularly, the flow rate of the fuel may dictate how much fuel additive is dispensed to be blended with the fuel, thus resulting in an exact proportion or ratio of fuel additive intermixed with the fuel.

In contrast to conventional on-demand fuel additive blending systems, which introduce a fixed quantity of the fuel additive into the fuel flow stream, the systems described herein are designed to continuously introduce the fuel additive into the fuel flow stream at a known fuel-to-fuel additive ratio for as long as the fuel flows. If the user throttles the nozzle 110 to regulate the flow of the fuel, whether to increase or decrease the flow rate, the continuous addition of the fuel additive will correspondingly be altered in proportion such that the known fuel-to-fuel additive ratio is always dispensed from the nozzle 110, regardless of the flow rate of the fuel. Accordingly, the systems described herein are stable at all flow rates because the flow rate of the fuel dictates the flow rate of the additive in a known ratio, such that the consumer is guaranteed to receive the correct ratio of fuel and fuel additive, no matter the rate of the flow.

FIG. 2A is a schematic flow diagram of one example of the blending system 114 of FIG. 1, according to one or more embodiments. As illustrated, the blending system 114 receives a fuel 202 and a fuel additive 204, and introduces (intermixes) the fuel additive 204 into the fuel 202 at a blending point 206. A product mixture 208 is then discharged and comprises a blend of the fuel 202 and the fuel additive 204. The product mixture 208 may then be dispensed to a user via the hose 108 (FIG. 1) and the nozzle 110 (FIG. 1), for example.

As illustrated, the blending system 114 includes a fuel conveyance device 209 that receives and/or conveys the fuel 202 and an additive conveyance device 212 configured to regulate the flow of the fuel additive 204 based on a volumetric flow rate of the fuel 202. The additive conveyance device 212 may comprise, for example, a pump (e.g., a positive displacement pump) or a motor of any kind suitable for pumping the fuel additive 204. In at least one embodiment, the additive conveyance device 212 may comprise a micropump or another type of positive displacement pump capable of pumping small, known amounts of the fuel additive 204.

In the illustrated embodiment, the fuel conveyance device 209 includes a pump 210 and a flow meter 214. The pump 210 may be configured to regulate the flow of the fuel 202. In at least one embodiment, the pump 210 may be the same as the pump 106 (FIG. 1), but could alternatively be a separate device. The flow meter 214 may be arranged to measure the volumetric flow rate of the fuel 202, and may comprise any device, mechanism, or system suitable for measuring the volumetric flow rate of the fuel 202.

Measurement signals obtained by the flow meter 214 may be provided to a computer system 216 in communication with the additive conveyance device 212. The computer system 216 may be programmed and otherwise configured to operate the additive conveyance device 212 based on the real-time measured flow rate of the fuel 202. More particularly, a known amount of the fuel additive 204 may be dispensed from the additive conveyance device 212 based on how much fuel 202 is being dispensed, as determined by the computer system 216. As a result, the fuel additive 204 is blended with the fuel 202 in proportion to obtain the product mixture 208 having a known fuel-to-fuel additive ratio.

In the past, blending fuel additives with fuel was largely achieved by the fuel provider (refiner), who delivered a pre-blended additive-fuel mixture to the fuel station. More recently, however, fuel additives can be blended with a fuel at the fuel dispensing unit 102 (FIG. 1) by delivering a pre-determined, fixed quantity of the fuel additive. When the fixed quantity of the additive is dispensed (or spent), however, the blending process stops. In contrast, the blending system 114 of FIG. 2A may be configured to continuously introduce the fuel additive 204 into the fuel 202 at a known ratio based on the volumetric flow rate of the fuel 202 as measured by the flow meter 214.

FIG. 2B is a schematic flow diagram of another example of the blending system 114 of FIG. 1, according to one or more additional embodiments. As illustrated, the blending system 114 receives the fuel 202 and the fuel additive 204, and introduces the fuel additive 204 into the fuel 202 at the blending point 206 to discharge the product mixture 208. In the illustrated embodiment, the fuel conveyance device 209 may comprise a hydraulic motor operable based on the flow of the fuel 202. More particularly, the fuel conveyance device 209 may be operatively coupled to the additive conveyance device 212 via a direct drive mechanism including a drive shaft 218.

In example operation, the fuel conveyance device 209 may be configured to receive the flow of the fuel 202, and convert the fluid energy of the flow into rotational energy that operates (drives) the additive conveyance device 212. More specifically, the fuel 202 flowing through the fuel conveyance device 209 may cause the drive shaft 218 to rotate, which, in turn, may cause the additive conveyance device 212 to operate and thereby dispense the fuel additive 204 to be blended with the fuel 206. The volumetric flow rate of the fuel 202 may dictate the rotational speed of the drive shaft 218 and correspondingly dictate how much fuel additive 204 is pumped. Consequently, a known amount of the fuel additive 204 may be dispensed from the additive conveyance device 212 and blended with the fuel 202 to obtain the product mixture 208 having a known fuel-to-fuel additive ratio.

In some embodiments, the drive shaft 218 may comprise first and second drive shaft lengths 221a and 221b with a coupling 220 interposing the opposing drive shaft lengths 221a,b. The coupling 220 may comprise a rigid coupling, a gearbox, a gear reducer, or similar mechanism that provides a predetermined or known drive input to the additive conveyance device 212 via the second drive shaft length 221b based on the rotation of the first drive shaft length 221a as driven by the fuel conveyance device 209. Accordingly, the rotational output of the drive shaft 218 driving the additive conveyance device 212 may be known such that a known ratio of fuel-to-fuel additive is consistently obtained. In at least one embodiment, however, the coupling 220 may be omitted and the drive shaft 218 may directly drive the additive conveyance device 212 based on the flow rate through the fuel conveyance device 209.

FIG. 2C is a schematic flow diagram of yet another example of the blending system 114 of FIG. 1, according to one or more additional embodiments. As illustrated, the blending system 114 receives the fuel 202 at the fuel conveyance device 209, which causes the drive shaft 218 to rotate based on the flow rate of the fuel 202. In the illustrated embodiment, the blending system 114 may include multiple additive conveyance devices, shown as a first additive conveyance device 212a, a second additive conveyance device 212b, and an nth additive conveyance device 212n. In some embodiments, as illustrated, the multiple additive conveyance devices 212a-n are arranged in parallel, but in other embodiments the additive conveyance devices 212a-n may be arranged in series, without departing from the scope of the disclosure.

The drive shaft 218 may be mechanically or operatively coupled to each of the additive conveyance devices 212a-n such that rotation of the drive shaft 218 may selectively operate one or all of the additive conveyance devices 212a-n. In some embodiments, each additive conveyance device 212a-n may comprise a positive displacement pump, such as micropump, but may alternatively comprise any type of pumping device suitable for pumping a fluid.

In some embodiments, rotation of the drive shaft 218 may cause simultaneous operation of the multiple additive conveyance devices 212a-n, which may be configured to simultaneously pump the same or different types of fuel additives 204 at the same or different ratios. In the illustrated embodiment, for example, the first and second additive conveyance devices 212a,b are configured to receive and pump a first fuel additive 204a, and the nth additive conveyance device 212n is designed to receive and pump an nth fuel additive 204n.

In some embodiments, two or more of the additive conveyance devices 212a-n may pump the same fuel additive 204, with each additive conveyance device 212a-n pumping at a different rate to achieve a different fuel-additive ratio. In one example, for instance, one additive conveyance device 212a-n may be configured to pump a small quantity of additive continuously so as to maintain a fixed fuel-additive ratio for the entire duration of the fueling process, while another additive conveyance device 212a-n may be configured to pump the same additive at a much higher rate so as to deliver a fixed dosage of fuel additive 204 in the shortest possible time. In another example, each additive conveyance device 212a-n may be configured to deliver different fuel-additive ratios selectable by the user.

Whether one or more of the multiple additive conveyance devices 212a-n are used at any given time may be dictated through use of one or more valves 222, which may be manually, mechanically, or electromechanically operated. In some embodiments, for instance, one or more of the valves 222 may comprise a solenoid valve operable based on a signal provided from a computer system. Accordingly, the blending system 114 may be able to provide different fixed-blend ratios that can be electromechanically actuated, as desired.

In operation, the fuel 202 and one or more of the fuel additives 204a-n may be mixed at the blending point 206 to discharge the product mixture 208. The valves 222 may be manually operated or automated to selectively introduce some or all of the fuel additives 204a-n, depending on user specifics. In at least one embodiment, the coupling 220 may be included to provide a predetermined or known drive input to the additive conveyance devices 212a-n based on the rotation of the drive shaft 218 driven by the fuel conveyance device 209.

Figure 2D:
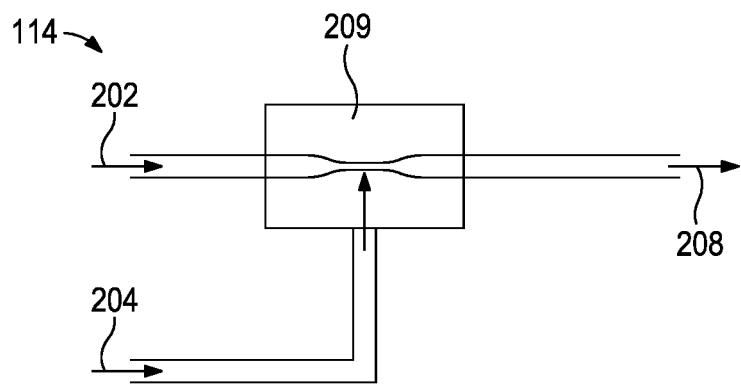
FIG. 2D is a schematic flow diagram of another example of the blending system of FIG. 1, according to one or more additional embodiments.

FIG. 2D is a schematic flow diagram of another example of the blending system 114 of FIG. 1, according to one or more additional embodiments. As illustrated, the blending system 114 receives the fuel 202 and the fuel additive 204. In the illustrated embodiment, the fuel conveyance device 209 may comprise an eductor or venturi system operable to create a vacuum based on flow of the fuel 202 that draws the fuel additive 204 into the fuel stream to be blended. By knowing the flow rate of the fuel 202, and the geometric configurations of the eductor or venturi system, the flow rate of the fuel additive 204 being introduced into the fuel 202 stream may be determined, and thereby result in a known fuel-to-fuel additive ratio.

Figure 3:
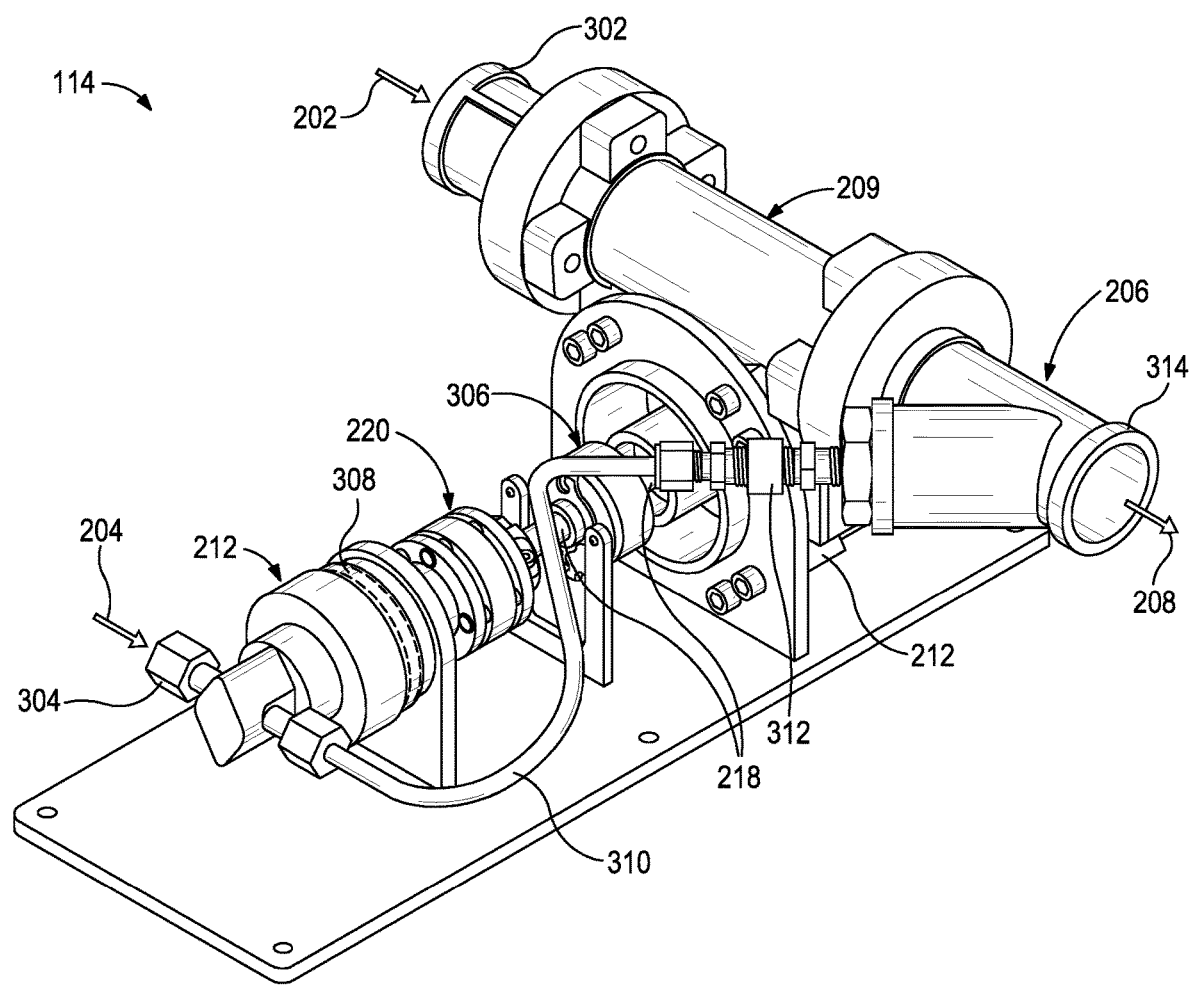
FIG. 3 is an isometric view of one example of the blending system of FIG. 1, according to one or more embodiments.

FIG. 3 is an isometric view of one example of the blending system 114 of FIG. 1, according to one or more embodiments. The blending system 114 of FIG. 3 may be similar in some respects to the blending system 114 schematically depicted in FIG. 2B, and thus may be best understood with reference thereto. The fuel 202 is received into the fuel conveyance device 209 at a high flow inlet 302. In some cases, the fuel 202 may be provided to the fuel conveyance device 209 from the pump 106 (FIG. 1) that draws the fuel 202 from the fuel storage tank 104 (FIG. 1). In the illustrated embodiment, the fuel conveyance device 209 may comprise, for example, a positive displacement, hydraulic motor or a similar device or mechanism capable of receiving an input of the fuel 202 and converting the fluid flow energy of the fuel 202 into rotational motion of the drive shaft 218. Accordingly, the flow energy of the fuel 202 may supply the primary flow energy to help operate the fuel conveyance device 209, which converts the motive fluid energy of the fuel 202 into mechanical energy by rotating the drive shaft 218.

The drive shaft 218 extends between and otherwise operatively couples the fuel conveyance device 209 and the additive conveyance device 212 such that rotating the drive shaft 218 through operation of the fuel conveyance device 209 causes the additive conveyance device 212 to operate. Accordingly, the additive conveyance device 212 is operable based on the flow rate of the fuel 202 circulated through the fuel conveyance device 209. The additive conveyance device 212 receives the fuel additive 204 at a low flow inlet 304. The additive conveyance device 212 may comprise a positive displacement pump, such as a micropump or the like.

The pumping specification of the additive conveyance device 212 may be between 200-1000 ppm, but may alternatively be capable of pumping between 90-3000 ppm at a flow rate as low as 0.5 gallons per minute (gpm). As will be appreciated, the foregoing specifications and parameters for the additive conveyance device 212 are provided merely for illustrative purposes and should not be considered limiting to the present disclosure. These parameters might change depending on the size of the additive conveyance device 212 and whether additional additive conveyance devices 212 are used simultaneously, as mentioned above.

The coupling 220 may interpose and rigidly couple the fuel conveyance device 209 and the additive conveyance device 212 through the drive shaft 218. As indicated above, the coupling 220 may comprise, for example, a rigid coupling, but may alternatively comprise a gearing ratio controller (e.g., a gear reducer) or a gearbox configured to alter the rotational speed of the portion of the drive shaft 218 (e.g., the second drive shaft length 221b of FIG. 2B) extending to the additive conveyance device 212 such that the additive conveyance device 212 is operated at a known speed. In at least one embodiment, the coupling 220 may be omitted and the additive conveyance device 212 may receive the drive input directly from the fuel conveyance device 209 via the drive shaft 218 and thereby cause the fuel additive 204 to be pumped.

The fuel conveyance device 209 may operate as a positive displacement device, such that its rotational displacement as a function of speed correlates to a specific amount of volume per revolution. Since the fuel conveyance device 209 drives operation of the additive conveyance device 212, the displacement of the additive conveyance device 212 for a given velocity may also be known. Thus, the blending system 114 may comprise a ratio-controlled mechanical system capable of tracking the instantaneous changes on the nozzle 110 (FIG. 1) by a user. More specifically, since operation of the additive conveyance device 212 is based on operation of the fuel conveyance device 209, a user may throttle the flow of the fuel 202 by actuating the nozzle 110 and the flow rate of the fuel additive 204 will correspondingly change to ensure that a specific fuel-to-fuel additive ratio is always dispensed.

In some embodiments, the blending system 114 may further include a rotary encoder 306 operatively coupled to the drive shaft 218 and used to measure and track the rotation of the drive shaft 218. More particularly, the rotary encoder 306 may measure the rotations per minute (RPM) of the drive shaft 218 to assess the amount of the fuel 202 and fuel additive 204 that is being pumped to the blending point 206. In some embodiments, the rotary encoder 306 may be communicably coupled to a computer system, such as the computer system 216 of FIG. 2A, and the computer system may be programmed to receive and track measurements from the rotary encoder 306. Based on the measured rotation, the flow rate of the fuel 202 and fuel additive 204 may be determined by the computer system. Accordingly, in at least one embodiment, the rotary encoder 306 may operate as a type of flow meter that helps determine the flow rate of the fuel 202 and fuel additive 204.

In some embodiments, the additive conveyance device 212 may include an internal flow ratio controller 308, which may comprise a proportional control capable of setting the volumetric displacement of the fuel additive 204 per revolution of the drive shaft 218, and thereby adjusting the volumetric blend ratio of the product mixture 208. More specifically, the internal flow ratio controller 308 can be used to calibrate operation of the additive conveyance device 212 and thereby adjust the flow output of the fuel additive 204. In at least one embodiment, for example, the flow ratio controller 308 may include an adjustable dial or module that allows the angular displacement of the additive conveyance device 212 to be altered, which correspondingly alters the flow output of the fuel additive 204. In some embodiments, adjustment of the flow ratio controller 308 may be manual and undertaken by a trained technician. Alternatively, adjustment of the flow ratio controller 308 may be automated or otherwise electromechanically actuated, such as through operation of one or more servo drives, solenoids, or other drive mechanisms and based on computer assisted programming. Accordingly, the flow ratio controller 308 ensures the output of a known fuel-to-fuel additive ratio while simultaneously providing the ability to vary the fuel-to-fuel additive ratio, if desired.

The fuel additive 204 may be pumped through a flow conduit 310 to the blending point 206 to be mixed with the fuel 202. In some embodiments, a one-way check valve 312 may be arranged inline within the flow conduit 310 to prevent the fuel 202 from flowing into the flow conduit 310. The product mixture 208 may be discharged from the blending system 114 at a mixed flow outlet 314.

Accordingly, the blending system 114 may be designed to blend two flow streams of radically different proportions by harnessing energy from the high-flow side flow stream (e.g., the flow of the fuel 202) at the fuel conveyance device 209. In at least one embodiment, this harvested energy may drive the drive shaft 218, which is ultimately connected to the additive conveyance device 212. For every revolution of the drive shaft 218 caused by the flow of the fuel 202, there may be an exact proportional amount of the fuel additive 204 mixed continuously into the fuel 202 at the blending point 206. This is achieved though the positive displacement geometrical composition of both the fuel conveyance device 209 and the additive conveyance device 212. The specific proportion or ratio may be controlled via one or both of the coupling 220 on the drive shaft 218 and the flow ratio controller 308 on the additive conveyance device 212. The flow ratio controller 308 can be calibrated along its continuum such that an exact or near exact fuel-to-fuel additive ratio can be achieved. Consequently, operation of the additive conveyance device 212 may be dynamically adjusted to meet various fuel-to-fuel additive blend ratios. In some applications, no further calibration of the additive conveyance device 212 may be necessary as any required tolerances can be maintained throughout the useful life of the product.

The blending system 114 may prove advantageous in that it does not require any additional source of energy (electrical or mechanical) other than the energy harvested from the flow of the fuel 202 through the fuel dispensing unit 102 as a user dispenses fuel. Moreover, while harvesting energy from the flow of the fuel 202, the blending system 114 may not noticeably slow down or impede the flow of the fuel 202.

Flow Diverter Manifold

Referring again to FIG. 1, the blending system 114 may be integrated with the fuel dispensing unit 102 in an efficient and aesthetically appealing manner. As illustrated, the blending system 114 may be mounted to the fuel dispensing unit 102, such as at or near the top of the fuel dispensing unit 102, and otherwise in a manner that it can be completely hidden from view by the consumer. The blending system 114 may be fluidly coupled to the fuel dispensing unit 102 via a flow diverter manifold 116 that may be operatively coupled to and interpose a blend block 118 and a breakaway coupling 120.

The blend block 118 may form an integral part of the fuel dispensing unit 102 or may otherwise be coupled thereto. The blend block 118 may comprise a block of material (e.g., aluminum, stainless steel, etc.) with internal conduits defined therein. The pump 106 may pump various types of the fuel 202 to the blend block 118, which circulate through and intermix within the internal conduits such that the fuel 202 may be dispensed at typical octane ratings of 87, 89, 90, or other atypical octane ratings.

In conventional fuel dispensing units, the breakaway coupling 120 would typically be coupled directly to the blend block 118, and the hose 108 extends from the breakaway coupling 120. The breakaway coupling 120 is designed to disconnect from the fuel dispensing unit 102 in the event a large tensile load is assumed by the hose 108, such as when a user inadvertently drives off with the nozzle 110 still inserted into the gas tank inlet of an automobile. In such embodiments, the breakaway coupling 120 is designed to fail and separate from the fuel dispensing unit 102, thus protecting the fuel dispensing unit 102 from serious damage.

In the illustrated embodiment, the flow diverter manifold 116 interposes the blend block 118 and the breakaway coupling 120. Importantly, installing the flow diverter manifold 116 on the fuel dispensing unit 102 may be done without cutting any lines of the fuel dispensing unit 102, altering any hardware of the fuel dispensing unit 102, and without impacting any of the safety features of the fuel dispensing unit 102 or the hose 108. Rather, all that needs to be done is to separate the breakaway coupling 120 from the blend block 118, and install the flow diverter manifold 116 between the blend block 118 and the breakaway coupling 120. As a result, installation and operation of the flow diverter manifold 116 will not void any warranty of the fuel dispensing unit 102.

The flow diverter manifold 116 may be configured to receive the fuel 202 from the blend block 118 and divert the fuel 202 to the blending system 114 where the fuel and the fuel additive 204 are mixed, as generally described herein. The product mixture 208 is subsequently discharged from the blending system 114 and returned to the flow diverter manifold 116 where it is conveyed to through the breakaway coupling 120 and to the hose 108 and the nozzle 110 for dispensing.

Figure 4:
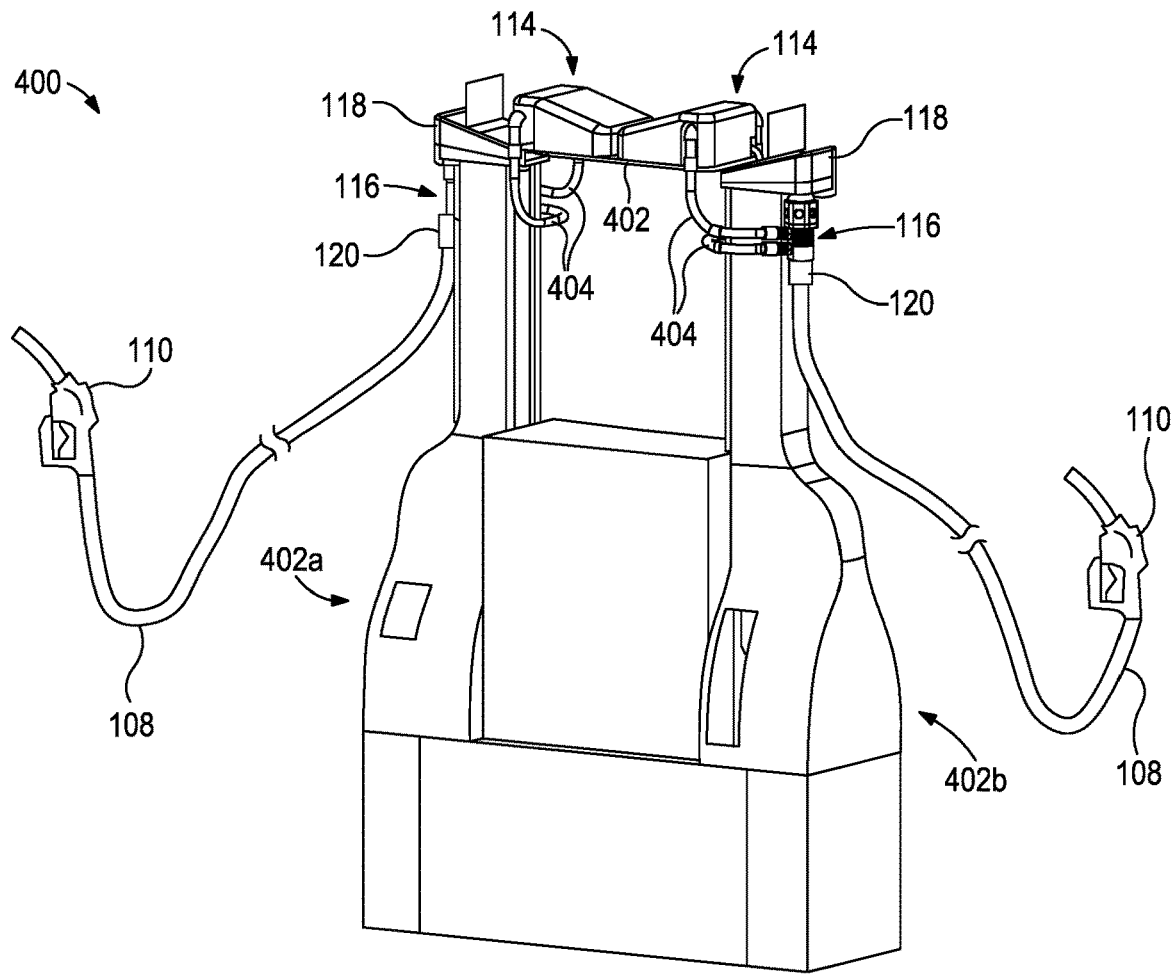
FIG. 4 is an isometric view of another example fuel dispensing unit that may incorporate one or more blending systems, according to one or more embodiments.

FIG. 4 is an isometric view of another example fuel dispensing unit 400 that may incorporate the principles of the present disclosure. The fuel dispensing unit 400 may be similar in some respects to the fuel dispensing unit 102 of FIG. 1 and may thus be best understood with reference thereto, where like numerals will correspond to like components not described again in detail. In the illustrated embodiment, the fuel dispensing unit 400 includes two side dispensing locations 402a and 402b, each with corresponding hoses 108 and nozzles 110 so that two users may use the fuel dispensing unit 400 simultaneously. Moreover, the fuel dispensing unit 400 further includes two blending systems 114, each associated with a corresponding hose 108 and nozzle 110. As illustrated, the blending systems 114 may be arranged on the top of the fuel dispensing unit 400 and may be generally out of view of the consumer. In the illustrated embodiment, the blending systems 114 are mounted to a common mounting plate 402 that extends between the blend blocks 118 and serves as a platform to secure the blending systems 114 to the fuel dispensing unit 400.

Each blending system 114 may be fluidly coupled to the fuel dispensing unit 400 at a corresponding flow diverter manifold 116 that interposes the corresponding blend block 118 and breakaway coupling 120. As illustrated, corresponding fluid lines 404 extend from and back to the flow diverter manifold 116 to divert the fuel 202 to the blending system 114 where the fuel 202 and the fuel additive 204 are mixed, and returned to the flow diverter manifold 116 where the product mixture 208 is conveyed to the hose 108 and the nozzle 110 for dispensing. In the illustrated embodiment, the fuel additive 204 for each blending system 114 may be obtained from corresponding storage tanks (not shown) attached to the sides of the fuel dispensing unit 400.

Figure 5:
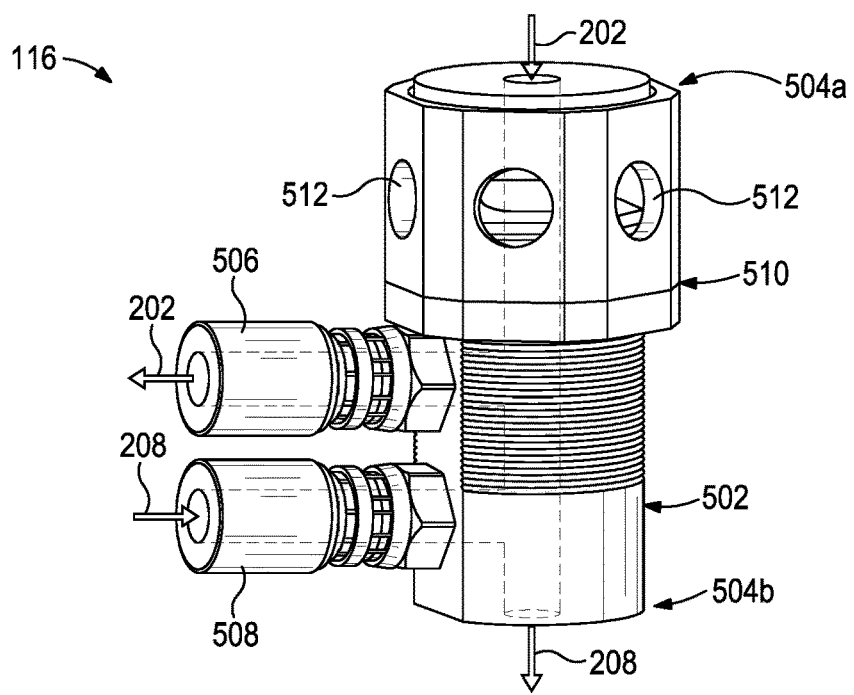
FIG. 5 is an enlarged isometric view of the flow diverter manifold of FIGS. 1 and 4, according to one or more embodiments.

FIG. 5 is an enlarged isometric view of one example of the flow diverter manifold 116, according to one or more embodiments. As illustrated, the flow diverter manifold 116 may provide a generally cylindrical body 502 having a first end 504a and a second end 504b opposite the first end 504a. The first end 504a may be operatively coupled to the blend block 118 (FIGS. 1 and 4), thus flow of the fuel 202 may enter the flow diverter manifold 116 at the first end 504a. An outlet adapter 506 may be coupled to the body 502 and provide an outlet for the fuel 202 to be diverted to the blending system 114, as described herein. An inlet adapter 508 may also be coupled to the body 502 and provide an inlet for the product mixture 208 to return to the flow diverter manifold 116. The second end 504b may be coupled to the breakaway coupling 120 (FIGS. 1 and 4), and through which flow of the product mixture 208 may exit the flow diverter manifold 116 to be dispensed through the hose 108 (FIGS. 1 and 4) and the nozzle 110 (FIGS. 1 and 4).

The flow diverter manifold 116 may be made of a rigid material, such as metal (e.g., aluminum, stainless steel, etc.), a polymer, a composite material, or any combination thereof. In some embodiments, the flow diverter manifold 116 may include a locking collar 510 that may be threadably attached to the body 502. When the flow diverter manifold 116 is coupled to the blend block 118 (FIGS. 1 and 4) at the first end 504a, the locking collar 510 may be threadably advanced toward the first end 504a until engaging the blend block 118 (e.g., its underside). Engaging the blend block 118 with the locking collar 510 provides additional strength to the flow diverter manifold 116. More particularly, shear forces assumed by the flow diverter manifold 116 at the second end 504b, such as through movement of the hose 108 (FIGS. 1 and 4) or disconnection of the breakaway coupling 120 (FIGS. 1 and 4), may be transferred to the blend block 118 via the locking collar 510 with an enhanced surface area of the locking collar 510.

In some embodiments, as illustrated, the locking collar 510 may define or otherwise provide one or more apertures 512. The apertures 512 may prove advantageous in allowing maintenance personnel to detect leaks at the fluid coupling between the flow diverter manifold 116 and the blend block 118.

Figure 6:
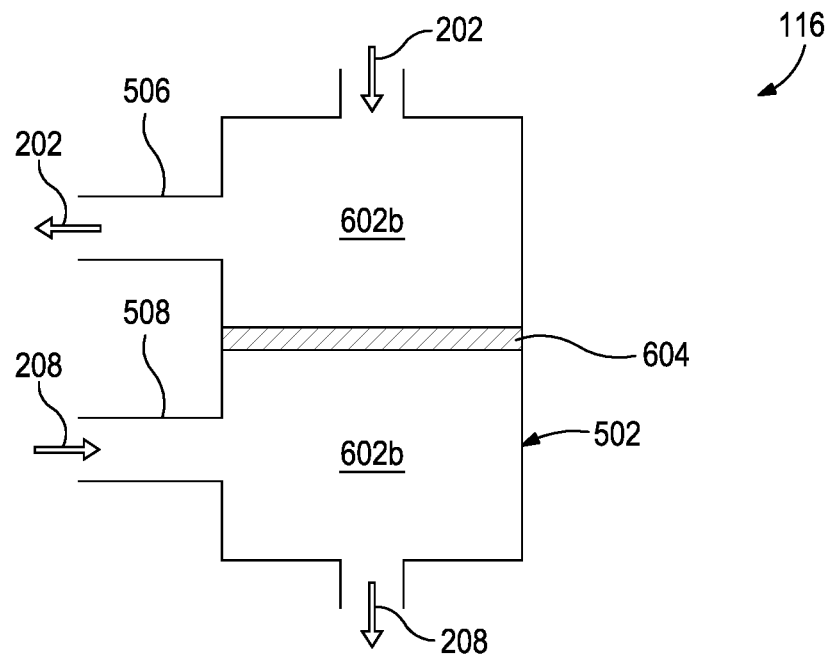
FIG. 6 is a schematic diagram of another embodiment of the flow diverter manifold of FIGS. 1 and 4, according to one or more embodiments.

FIG. 6 is a schematic flow diagram of the flow diverter manifold 116, according to one or more embodiments. In the illustrated embodiment, the body 502 of the flow diverter manifold 116 may define or otherwise define a first chamber 602a and a second chamber 602b, and the first and second chambers 602a,b may be separated by a rotatable interface 604. Fuel 202 may enter the flow diverter manifold 116 and flow into the first chamber 602a where the fuel 202 is diverted to the blending system 114 via the outlet adapter 506. As described herein, the fuel additive 204 (FIGS. 2A-2D and 3) is added to the fuel 202 in the blending system 114 in know proportions, and the resulting product mixture 208 returns to the flow diverter manifold 116 via the inlet adapter 508, The inlet adapter 508 conveys the product mixture 208 into the second chamber 602b, from which the product mixture 208 exits the flow diverter manifold 116 to be dispensed through the hose 108 (FIGS. 1 and 4) and the nozzle 110 (FIGS. 1 and 4).

In some embodiments, the first and second chambers 602a,b may be rotatably mounted to each other at the rotatable interface 604. More specifically, the rotatable interface 604 allows the first and second chambers 602a,b to rotate relative to one another, thus allowing the outlet and inlet adapters 506, 508 to be angularly oriented in a variety of angular configurations. In a least one embodiment, the rotatable interface 604 may comprise a ball bearing arrangement, compression fitting, or a simpler setup such as an inner rigid body sleeve to which the chambers 602a,b can be threadably attached. This may prove advantageous in allowing the fluid connections at the outlet and inlet adapters 506, 508 to be coupled without straining the connections. Rather, the outlet and inlet adapters 506, 508 may be rotated to accommodate the general orientation of the fluid connections.

In-Field Testing and Calibration

Figure 7:
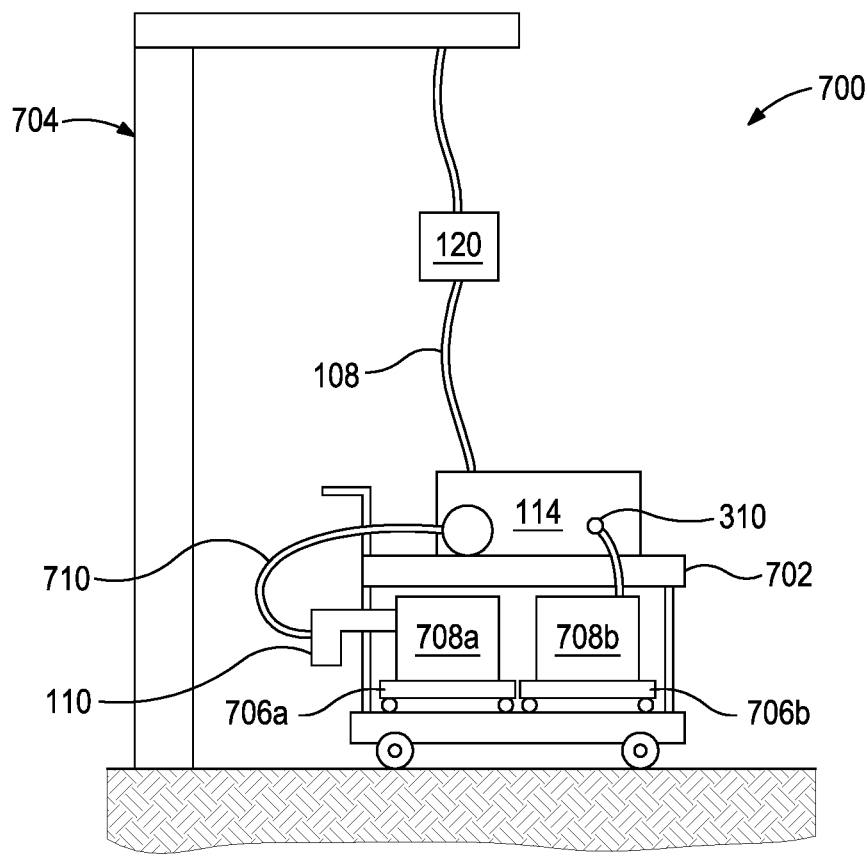
FIG. 7 is a schematic diagram of an example in-field testing and calibration apparatus.

FIG. 7 is a schematic diagram of an example in-field testing and calibration apparatus 700. The in-field testing and calibration apparatus 700 (hereafter the "apparatus 700") may be used to test and calibrate a blending system, such as the blending systems 114 described herein, prior to installation and integration with a fuel dispensing system. As illustrated, the apparatus 700 may include a cart 702 on which all of the component parts of the apparatus 700 and the blending system 114 may be arranged for transport. In some embodiments, the blending system 114 may be tested and calibrated in conjunction with a fuel dispenser unit 704, such as either of the fuel dispenser units 100, 400 (FIGS. 1 and 4) described herein. As illustrated, the fuel dispenser unit 704 includes the hose 108 and the breakaway coupling 120 is installed in the hose 108.

The apparatus 700 may further include two precision laboratory scales 706a and 706b and two gas containers 708a and 708b arranged atop the scales 708 to measure fluid weight. One of the gas containers 708a is used for collecting dispensed fuel and the other gas container 708b is used for collecting fuel additive. Accordingly, the first scale 706a may be configured to measure the fluid weight of the dispensed fuel, and the second scale 706b may be configured to measure the weight of the dispensed fuel additive.

The nozzle 110 is detached from the hose 108 and is instead attached to a dispenser hose 710. The outlet of the nozzle 110 is directed to the first gas container 704, and the open end of hose 108 after detaching the nozzle 110 is attached to the fuel inlet of the blending system 114, such as the high flow inlet 302 of FIG. 3. The outlet of the additive flow 310 is routed to the second gas container 708b. The scales 706a,b are tared (zeroed) prior to field calibration, and a specific amount of fuel is manually dispensed into the first gas container 706a by flowing through (traversing) the dispensing system 114, whereby a corresponding volume of fuel additive is pumped and collected in the second gas container 708b. Accurate temperature and weight of the fuel and fuel additive may then be taken and the volume of respective fuel and fuel additive in their respective collecting containers 708a,b may then be computed, which facilitates the determination of the ratio of fuel-to-fuel additive. This computed value is then used to set the adjustment and/or calibration of the blending system 114 to the desired fuel-to-fuel additive ratio by adjusting by any of the means described herein.

Embodiments disclosed herein include:

A. A fuel dispensing system that includes a fuel dispensing unit that receives fuel from a fuel storage tank, a blending system in fluid communication with the fuel dispensing unit and including a fuel conveyance device that receives the fuel from the fuel dispensing unit, and an additive conveyance device that pumps a fuel additive to be blended with the fuel based on a volumetric flow rate of the fuel, whereby the blending system provides a product mixture having a known fuel-to-fuel additive ratio. The fuel dispensing system further including a hose and a nozzle in fluid communication with the blending system to dispense the product mixture.

B. A blending system that includes a fuel conveyance device that receives a fuel, and an additive conveyance device that pumps a fuel additive to be blended with the fuel based on a volumetric flow rate of the fuel, whereby a product mixture having a known fuel-to-fuel additive ratio is generated.

C. A method of dispensing fuel that includes pumping a fuel from a fuel storage tank to a fuel dispensing unit, conveying the fuel to a blending system in fluid communication with the fuel dispensing unit and including a fuel conveyance device and an additive conveyance device, pumping a fuel additive with the additive conveyance device based on a volumetric flow rate of the fuel through the fuel conveyance device, blending the fuel additive with the fuel and thereby generating a product mixture having a known fuel-to-fuel additive ratio, and dispensing the product mixture from the fuel dispensing unit.

D. A blending system includes a first flow controller that receives a first fluid, and a second flow controller that pumps a second fluid to be mixed with the first fluid based on a volumetric flow rate of the first fluid, whereby a product mixture having a known ratio of the first and second fluids is generated.

Each of embodiments A, B, C, and D may have one or more of the following additional elements in any combination: Element 1: wherein the fuel conveyance device further includes a flow meter that measures the volumetric flow rate of the fuel, and a computer system communicably coupled to the flow meter and the additive conveyance device, the computer system being programmed to receive real-time flow rate measurements from the flow meter and operate the additive conveyance device based on the volumetric flow rate of the fuel. Element 2: wherein the blending system further comprises a drive shaft extending between the fuel conveyance device and the additive conveyance device, wherein flow of the fuel through the fuel conveyance device drives the drive shaft and thereby causes the additive conveyance device to pump the fuel additive. Element 3: wherein the drive shaft extends to one or more additional additive conveyance devices and rotation of the drive shaft causes operation of the additive conveyance device and at least one of the one or more additional additive conveyance devices. Element 4: wherein the additive conveyance device pumps a first fuel additive and the at least one of the one or more additional additive conveyance devices pumps a second fuel additive different from the first fuel additive. Element 5: wherein the fuel conveyance device comprises an eductor that creates a vacuum that draws the fuel additive to be blended with the fuel. Element 6: wherein the fuel additive is selected from the group consisting of a detergent, an oxidizer, a stabilizer, an anti-knock agent, a lead scavenger, a fuel dye, antifreeze, a cylinder lubricant, an anti-gelling agent, a fuel injector cleaner, an octane booster, and any combination thereof. Element 7: further comprising a blend block coupled to the fuel dispensing unit to receive the fuel from the storage tank, and a flow diverter manifold coupled to the blend block and operable to divert the fuel to the blending system and receive the product mixture from the blending system, wherein the flow diverter manifold is fluidly coupled to the hose to convey the product mixture to the hose. Element 8: wherein the flow diverter manifold comprises a rigid body having a locking collar threadably attached thereto, and wherein the locking collar is engageable against the blend block to enhance strength of the flow diverter manifold.

Element 9: wherein the fuel conveyance device includes a flow meter that measures the volumetric flow rate of the fuel, and a computer system communicably coupled to the flow meter and the additive conveyance device, the computer system being programmed to receive real-time flow rate measurements from the flow meter and operate the additive conveyance device based on the volumetric flow rate of the fuel. Element 10: wherein the blending system further comprises a drive shaft extending between the fuel conveyance device and the additive conveyance device, wherein flow of the fuel through the fuel conveyance device drives the drive shaft and thereby causes the additive conveyance device to pump the fuel additive. Element 11: wherein the drive shaft includes a coupling that provides a known drive input to the additive conveyance device based on rotation of the drive shaft driven by the fuel conveyance device. Element 12: further comprising one or more additional additive conveyance devices, wherein the drive shaft extends to the one or more additional additive conveyance devices and rotation of the drive shaft causes operation of the additive conveyance device and at least one of the one or more additional additive conveyance devices. Element 13: wherein the additive conveyance device pumps a first fuel additive and the at least one of the one or more additional additive conveyance devices pumps a second fuel additive different from the first fuel additive. Element 14: further comprising a rotary encoder operatively coupled to the drive shaft to measure rotation of the drive shaft. Element 15: wherein the fuel conveyance device comprises an eductor that creates a vacuum that draws the fuel additive to be blended with the fuel. Element 16: wherein the additive conveyance device includes a flow ratio controller operable to adjust an output of the fuel additive.

By way of non-limiting example, exemplary combinations applicable to A, B, C, and D include: Element 2 with Element 3; Element 3 with Element 4; Element 7 with Element 8; Element 10 with Element 11; Element 10 with Element 12; Element 12 with Element 13; and Element 10 with Element 14.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A fuel dispensing system, comprising:
   a fuel dispensing unit that receives fuel from a fuel storage tank;
   a blending system separate from but in fluid communication with the fuel dispensing unit and including:
      a fuel conveyance device that receives the fuel diverted from the fuel dispensing unit; and
      an additive conveyance device that pumps a fuel additive to be blended with the fuel based on a volumetric flow rate of the fuel through the fuel conveyance device, whereby the blending system provides a product mixture having a known fuel-to-fuel additive ratio; and
   a hose and a nozzle in fluid communication with the blending system to receive the product mixture from the blending system and dispense the product mixture.

2. The fuel dispensing system of claim 1, wherein the fuel conveyance device further includes:
   a flow meter that measures the volumetric flow rate of the fuel; and
   a computer system communicably coupled to the flow meter and the additive conveyance device, the computer system being programmed to receive real-time flow rate measurements from the flow meter and operate the additive conveyance device based on the volumetric flow rate of the fuel.

3. The fuel dispensing system of claim 1, wherein the blending system further comprises a drive shaft extending between the fuel conveyance device and the additive conveyance device, and wherein flow of the fuel through the fuel conveyance device drives the drive shaft and thereby causes the additive conveyance device to pump the fuel additive.

4. The fuel dispensing system of claim 3, wherein the drive shaft extends to one or more additional additive conveyance devices and rotation of the drive shaft causes operation of the additive conveyance device and at least one of the one or more additional additive conveyance devices.

5. The fuel dispensing system of claim 4, wherein the additive conveyance device pumps a first fuel additive and the at least one of the one or more additional additive conveyance devices pumps a second fuel additive different from the first fuel additive.

6. The fuel dispensing system of claim 1, wherein the fuel conveyance device comprises an eductor that creates a vacuum that draws the fuel additive to be blended with the fuel.

7. The fuel dispensing system of claim 1, wherein the fuel additive is selected from the group consisting of a detergent, an oxidizer, a stabilizer, an anti-knock agent, a lead scavenger, a fuel dye, antifreeze, a cylinder lubricant, an anti-gelling agent, a fuel injector cleaner, an octane booster, and any combination thereof.

8. The fuel dispensing system of claim 1, further comprising:
   a blend block coupled to the fuel dispensing unit to receive the fuel from the storage tank; and
   a flow diverter manifold coupled to the blend block and operable to divert the fuel to the blending system and receive the product mixture from the blending system, wherein the flow diverter manifold is fluidly coupled to the hose to convey the product mixture to the hose.

9. The fuel dispensing system of claim 8, wherein the flow diverter manifold comprises a rigid body having a locking collar threadably attached thereto, and wherein the locking collar is engageable against the blend block to enhance strength of the flow diverter manifold.

10. A blending system, comprising:
    a fuel conveyance device that receives a fuel diverted from a fuel dispensing unit;

an additive conveyance device that pumps a fuel additive based on a volumetric flow rate of the fuel; and a blending point downstream from the fuel conveyance device and the additive conveyance device where the fuel and the fuel additive are blended to generate a product mixture having a known fuel-to-fuel additive ratio.

11. The blending system of claim 10, wherein the fuel conveyance device includes:

a flow meter that measures the volumetric flow rate of the fuel; and a computer system communicably coupled to the flow meter and the additive conveyance device, the computer system being programmed to receive real-time flow rate measurements from the flow meter and operate the additive conveyance device based on the volumetric flow rate of the fuel.

12. The blending system of claim 10, wherein the blending system further comprises a drive shaft extending between the fuel conveyance device and the additive conveyance device, wherein flow of the fuel through the fuel conveyance device drives the drive shaft and thereby causes the additive conveyance device to pump the fuel additive.

13. The blending system of claim 12, wherein the drive shaft includes a coupling that provides a known drive input to the additive conveyance device based on rotation of the drive shaft driven by the fuel conveyance device.

14. The blending system of claim 12, further comprising one or more additional additive conveyance devices, wherein the drive shaft extends to the one or more additional additive conveyance devices and rotation of the drive shaft causes operation of the additive conveyance device and at least one of the one or more additional additive conveyance devices.

15. The blending system of claim 14, wherein the additive conveyance device pumps a first fuel additive and the at least one of the one or more additional additive conveyance devices pumps a second fuel additive different from the first fuel additive.

16. The blending system of claim 12, further comprising a rotary encoder operatively coupled to the drive shaft to measure rotation of the drive shaft.

17. The blending system of claim 10, wherein the fuel conveyance device comprises an eductor that creates a vacuum that draws the fuel additive to be blended with the fuel.

18. The blending system of claim 10, wherein the additive conveyance device includes a flow ratio controller operable to adjust an output of the fuel additive and thereby adjust a volumetric blend ratio of the product mixture.

19. A method of dispensing fuel, comprising:

pumping a fuel from a fuel storage tank to a fuel dispensing unit;

diverting the fuel from the fuel dispensing unit to a blending system separate from but in fluid communication with the fuel dispensing unit and including a fuel conveyance device and an additive conveyance device;

pumping the fuel through the fuel conveyance device;

pumping a fuel additive with the additive conveyance device based on a volumetric flow rate of the fuel through the fuel conveyance device;

blending the fuel additive with the fuel at a blending point downstream from the fuel conveyance device and the additive conveyance device and thereby generating a product mixture having a known fuel-to-fuel additive ratio;

conveying the product mixture back to the fuel dispensing unit; and dispensing the product mixture from the fuel dispensing unit.

* * * * *